(12) United States Patent
Kataoka et al.

(10) Patent No.: US 7,355,312 B2
(45) Date of Patent: Apr. 8, 2008

(54) BRUSHLESS MOTOR

(75) Inventors: Nakaba Kataoka, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/164,367

(22) Filed: Nov. 21, 2005

(65) Prior Publication Data

US 2006/0192511 A1 Aug. 31, 2006

(30) Foreign Application Priority Data

Nov. 19, 2004 (JP) ............................. 2004-335694
Nov. 2, 2005 (JP) ............................. 2005-319752

(51) Int. Cl.
*H02K 21/12* (2006.01)
(52) U.S. Cl. .................... 310/156.43; 310/51
(58) Field of Classification Search .................. 310/51, 310/216; 318/254
See application file for complete search history.

(56) References Cited

U.S. PATENT DOCUMENTS

| | | | | |
|---|---|---|---|---|
| 5,015,903 A | * | 5/1991 | Hancock et al. | 310/168 |
| 5,753,991 A | * | 5/1998 | Couture et al. | 310/156.46 |
| 6,075,302 A | * | 6/2000 | McCleer | 310/166 |
| 6,130,492 A | * | 10/2000 | Satake et al. | 310/68 R |
| 6,144,132 A | * | 11/2000 | Nashiki | 310/156.55 |
| 6,211,593 B1 | * | 4/2001 | Nashiki | 310/156.33 |
| 6,351,053 B1 | * | 2/2002 | Minoshima et al. | 310/216 |
| 2002/0047478 A1 | * | 4/2002 | Higashino et al. | 310/259 |
| 2002/0101126 A1 | * | 8/2002 | Crapo et al. | 310/156.01 |
| 2002/0175581 A1 | * | 11/2002 | Ohnishi et al. | 310/156.01 |
| 2003/0080642 A1 | * | 5/2003 | Mori et al. | 310/156.57 |
| 2003/0107290 A1 | * | 6/2003 | De Filippis | 310/216 |

FOREIGN PATENT DOCUMENTS

JP   H11-332160 A   11/1999

\* cited by examiner

*Primary Examiner*—Thanh Lam
(74) *Attorney, Agent, or Firm*—Keating & Bennett, LLP

(57) ABSTRACT

Small brushless motor having high output and small torque ripple. The brushless motor includes induction voltage adjusting means. With this, induction voltage of each phase of the stator is adjusted into a flatly spread waveform having no abrupt variation where odd-numbered of order harmonic is superposed, thereby obtaining a small motor having high output capable of efficiently generating large torque with small ripple.

14 Claims, 18 Drawing Sheets

| Measuring Item | | Unit | present invention 12S10P (skew ratio 25%) | conventional structure 12S8P (skew ratio 60%) |
|---|---|---|---|---|
| order component content of one phase induction voltage | basic wave | % | 90.0 | 96.7 |
| | 3 order harmonic | % | 6.8 | 0.2 |
| | 5 order harmonic | % | 0.2 | 0.3 |
| Input Value | | W | 690 | 840 |
| Output Value | | W | 340 | 340 |
| Resistance Value between Terminals | | mΩ | 17.4 | 20.8 |

FIG. 18

BRUSHLESS MOTOR

BACKGROUND OF THE INVENTION

1. Field of the Invention

The present invention relates to a brushless motor, and more specifically, to a structure for suppressing generation of torque ripple, and for enhancing the efficiency.

2. Description of the Related Art

Power steering for appropriately assisting a force required at the time of steering operation becomes prevalent, and it becomes possible for a driver to carry out the steering operation with a slight force, and driving comfort and safety of a vehicle have largely been enhanced. There are electric power steering and hydraulic power steering having different power sources. The electric power steering is superior in efficiency because appropriate amount of assist force is generated when necessary. As a power steering motor for generating the assist force, a synchronous brushless motor such as a three-phase brushless motor is used.

The brushless motor comprises a rotor having a rotatable shaft as its axis, and a stator surrounding an outer periphery of the rotor. On an outer periphery of the columnar rotor, a plurality of field magnets are radially arranged in an axial stripe shape such that the south pole and the north pole appear alternately in the circumferential direction. As the producing method, a method in which a segment magnet is pasted on a surface of the rotor, a method in which a segment magnet is embedded in the rotor, or a method in which an annular magnet polarized with the south pole and the north pole alternately in the circumferential direction is fitted over the rotor is used. Axial stripe slots are formed in phase positions in an inner periphery of an annular stator core constituting the stator, and portions (teeth) between the slots are arranged radially and projecting toward an inner diameter direction of a stator yoke. Coils are wound around the teeth to form winding (armature winding) of each phase.

If three phase motor current which is changed into sine wave shape or rectangular wave shape (including trapezoidal wave shape) is supplied to the winding of each phase, the rotor rotates and the brushless motor is driven.

A phenomenon in which torque pulses is generated due to heterogeneity of interaction generated between magnetic field of a magnet and teeth or slot of the stator. This torque is called cogging torque. To suppress the cogging torque as small as possible, a magnetic pole shape of the rotor and teeth shape of the stator of the brushless motor are researched. For example, there is a known skew processing in which an axial stripe magnetic pole pattern of the rotor is inclined in the axial direction, thereby averaging torque generated every rotation phase, and smoothening the entire rotation torque. The induction voltage waveform of each phase can be formed into a smooth sine waveform by carrying out the skew processing.

When the brushless motor is used as the power steering motor and the steering mechanism is driven directly by the motor, it is necessary to reduce rotation variations of the motor, reduce noise, enhances torque generation efficiency, to reduce the motor in size and to enhance its performance so that the driver is not offended. This is strongly required when it is used in a heavy and large so-called luxury car class.

Usually, a brushless motor is driven by current which is varied into sine wave form with respect to time (sine wave drive, hereinafter) in many cases. In this case, motor current of each phase is in the sine waveform as shown in solid lines iu, iv and iw in FIG. 14, induction voltage (also called counterelectromotive force) is sine waveform having the same phase as the motor current as shown in solid lines eu, ev and ew in FIG. 15.

Generation torque of the motor is obtained by the product of the torque constant and the motor current. Since the torque constant corresponds to the counterelectromotive force constant, torque generated by each motor phase becomes substantially equal to the product of the induction voltage and the motor current, and in the case of the motor, the torque becomes equal to the product of the induction voltage of sine wave and current of sine wave.

A total value of generation torques of the phases, i.e., the generation torques of the entire motor is stable torque value having small torque ripple as shown in FIG. 16, but its torque value is small. This is because that since not only the motor current but also the induction voltage is also varied with time in synchronism with in the form of sine wave, the induction voltage cannot be utilized sufficiently for generating torque. In the conventional brushless motor of this kind, since the generation efficiency of torque is poor, there is limitation for reducing the motor in size and to enhancing the output of the motor.

To enhance the utilizing efficiency of motor current and induction voltage, the waveforms of the motor current and induction voltage should be increased flatly. A driving method (rectangular wave driving or trapezoidal wave driving, hereinafter) in which time variation waveform of motor current rectangular wave or trapezoidal wave shape, the induction voltage is adjusted to rectangular wave having the same phase, torque generated in each phase becomes equal to the product of induction voltage of the rectangular wave and current of rectangular wave. However, in the case of this method, since the motor current is rectangular waveform, the ON-OFF switching of current is abruptly changed, and there is inconvenience that variation is generated in motor torque, and it is necessary to take measures against this. It is difficult to generate the rectangular wave induction voltage having the same phase as that of the motor current only by devising concerning the motor structure and thus, it is necessary to adjust the driving control method and winding method, and it is difficult to produce a small and efficient brushless motor.

If the applied voltage of each phase is increased, the motor output is increased. That is, if input voltage can be increased, it is possible to reduce the size of motor which outputs predetermined torque. However, in the power steering motor for vehicle, since the applied voltage is determined by specification on the side of power supply, it is difficult to increase the applied voltage. Therefore, it is necessary to consider how to reduce the motor in size and to increase its output under the given applied voltage condition.

BRIEF SUMMARY OF THE INVENTION

The present invention has been accomplished in view of the above points, and it is an object of the invention to provide a small brushless motor having high output capable of efficiently obtaining smooth torque performance without changing input voltage and power consumption specification.

To solve the above problem, the brushless motor of the present invention is characterized in that the brushless motor includes induction voltage adjusting means for adjusting induction voltage of each phase of the stator to waveform on which the odd-numbered order harmonic is superposed. With this structure, since the induction voltage waveform can be formed into a flat and spread shape. Thus, it is possible to increase the output torque of the motor without increasing the input of the motor.

As one preferable mode of the induction voltage adjusting means of the invention, there is a method for setting the number of magnetic poles of the rotor and the number of slots of the stator to a predetermined number of combinations.

As another preferable means, the disposition shape of the magnetic poles of the rotor may be deformed from the stripe shape in the axial direction, and the distances between the slots of the stator may not be uniform, and uneven teeth may be disposed.

More preferable, the odd-numbered order induction voltage to be superposed on each phase of the stator and generated may be 3 order harmonic, and input current of the motor of each phase of the stator is of sine waveform, more excellent result can be obtained.

Further, 3 order harmonic can be superposed on current waveform of each phase on the side of the motor control circuit. In this method, however, although the peak value of the applied voltage between terminals is not varied, the voltage effective value of each phase rises. Thus, even if the effective current value is increased, the input is increased. That is, in this method, although the output is increased, the input is also increased and thus, the entire efficiency is not enhanced.

BRIEF DESCRIPTION OF THE SEVERAL VIEWS OF THE DRAWINGS

FIG. 18 is a diagram for comparison of characteristics actually measured value between the motor (12S10P) of the present invention and the conventional motor (12S8P).

DETAILED DESCRIPTION OF THE INVENTION

Best Mode for Carrying Out the Invention

Embodiments of the present invention will be described in detail with reference to FIGS. 1 to 9.

First Embodiment

A first embodiment of the invention will be explained first with reference to FIGS. 1 to 7.

Figure 1:
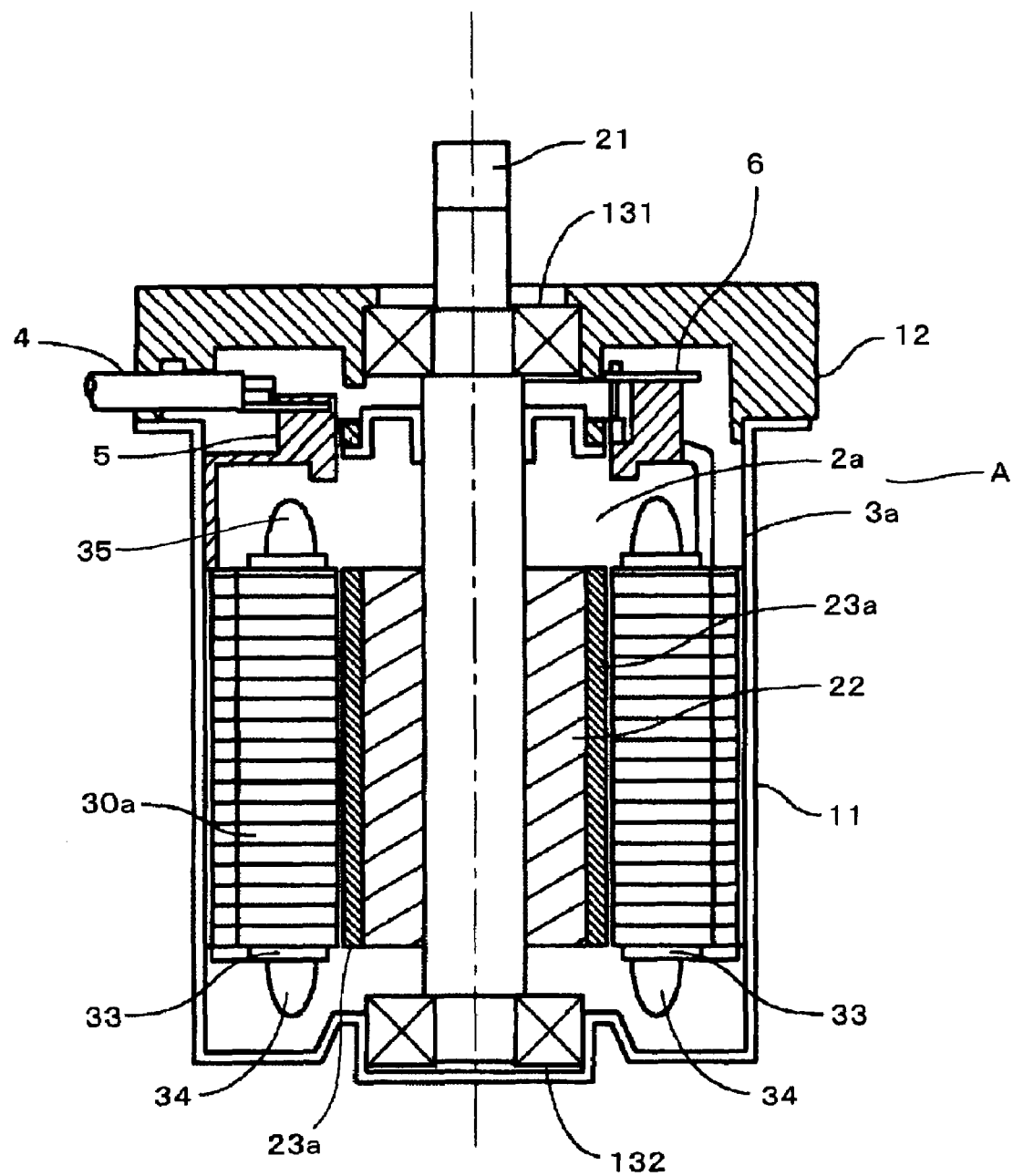
FIG. 1 is a vertical sectional view of a brushless motor of a first embodiment of the present invention.
Figure 2:
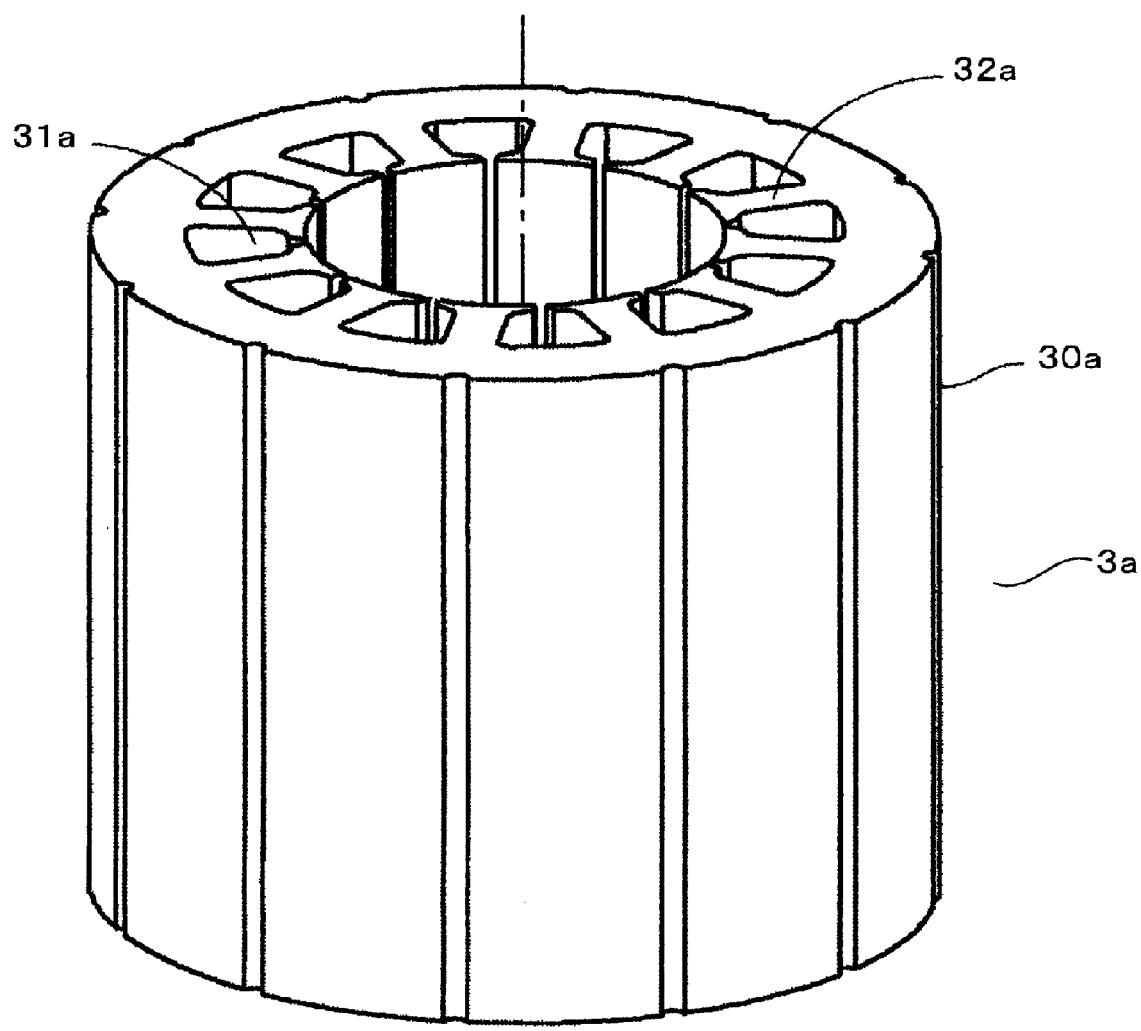
FIG. 2 is a perspective view of a stator of the brushless motor shown in FIG. 1.
Figure 3:
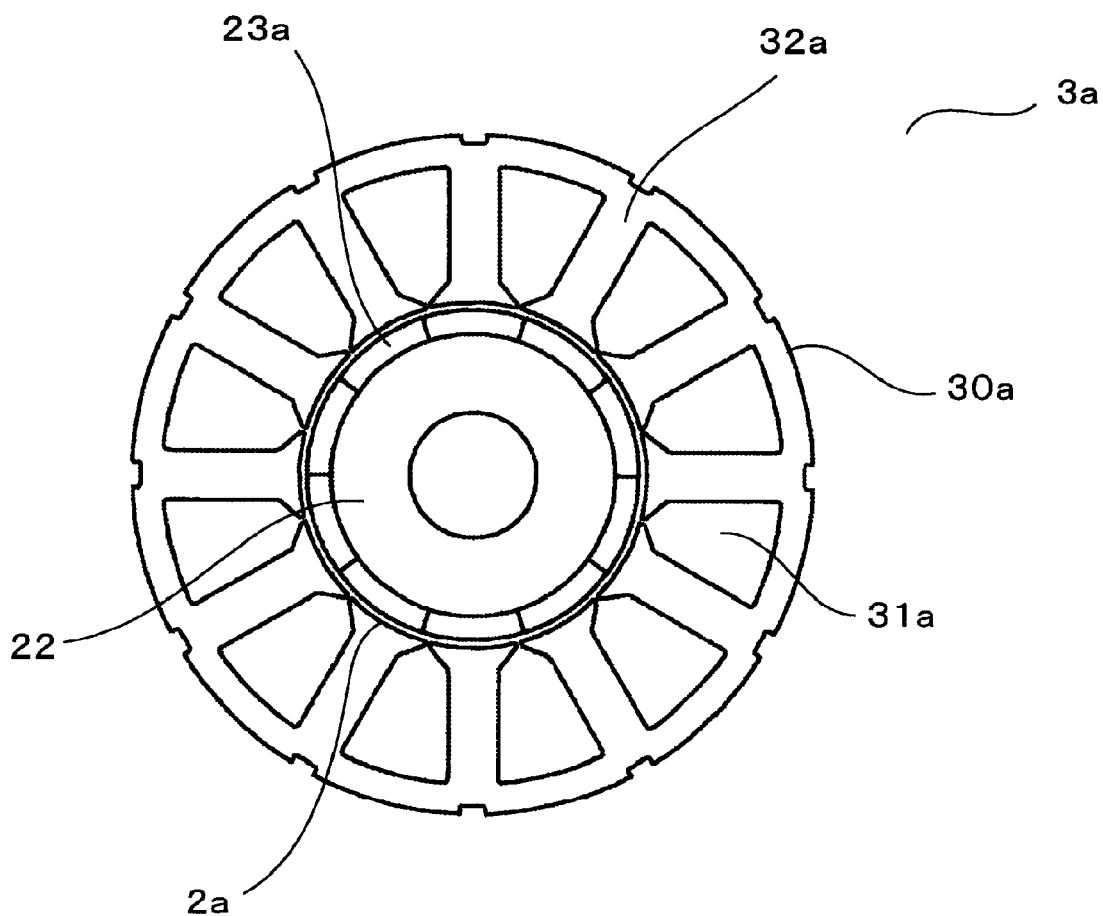
FIG. 3 is a plan view of a portion of the brushless motor shown in FIG. 1.

FIG. 1 is a vertical sectional view of a brushless motor forming a directly driving type power steering motor. FIG. 2 is a perspective view of a stator of the brushless motor shown in FIG. 1. FIG. 3 is a plan view of a portion of the brushless motor shown in FIG. 1.

Figure 4:
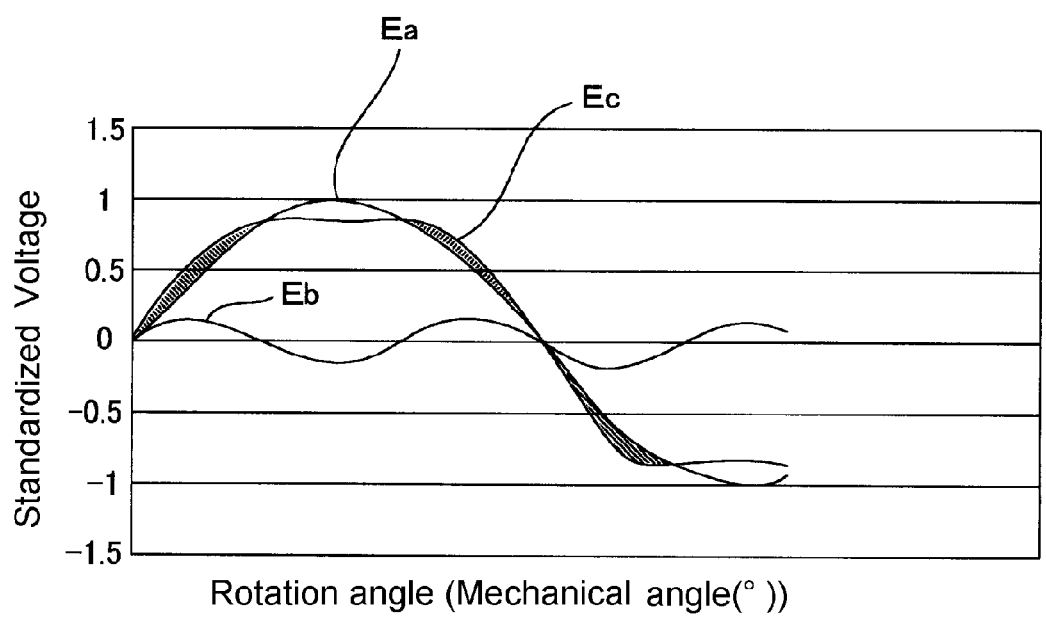
FIG. 4 is an explanatory diagram of induction voltage of the brushless motor shown in FIG. 1.
Figure 5:
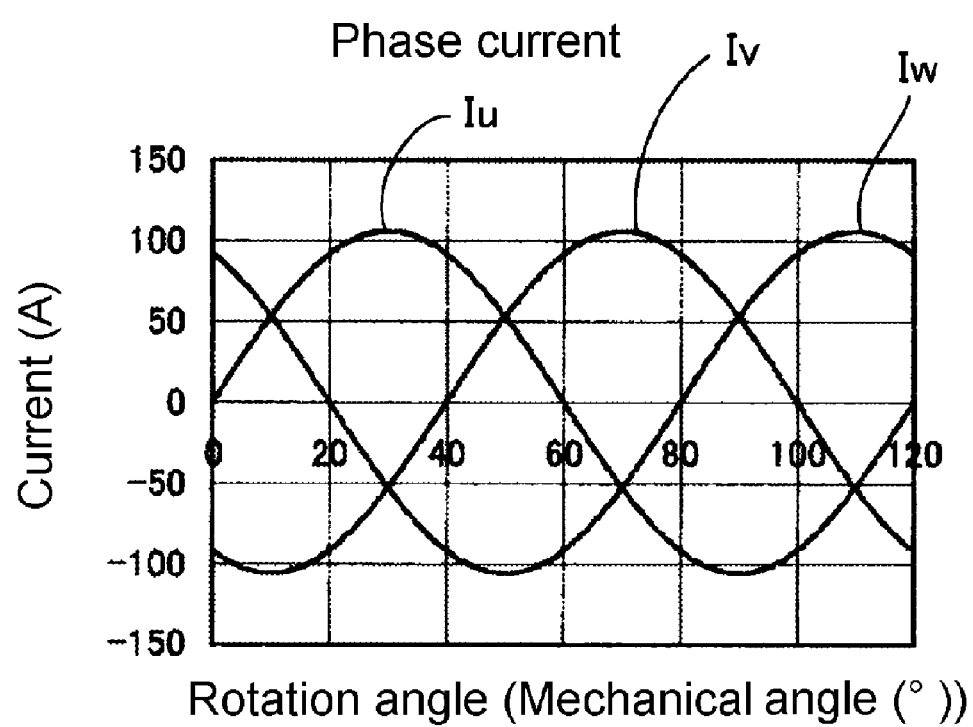
FIG. 5 is a waveform diagram of motor current of each phase of the brushless motor shown in FIG. 1.
Figure 6:
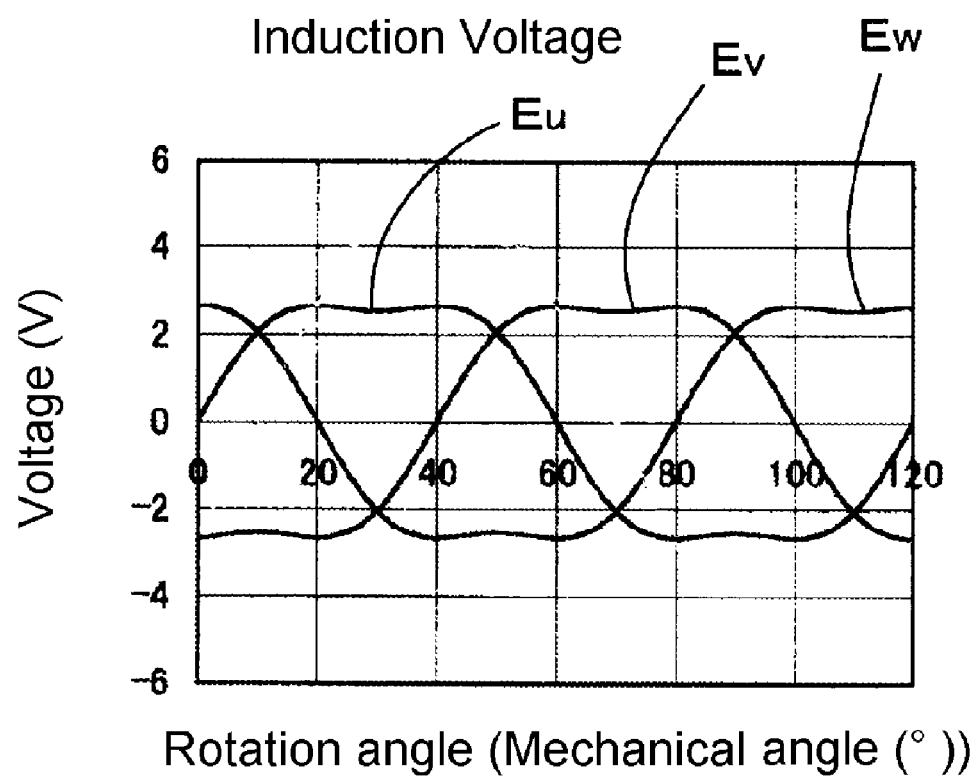
FIG. 6 is a waveform diagram of induction voltage of each phase of the brushless motor shown in FIG. 1.
Figure 7:
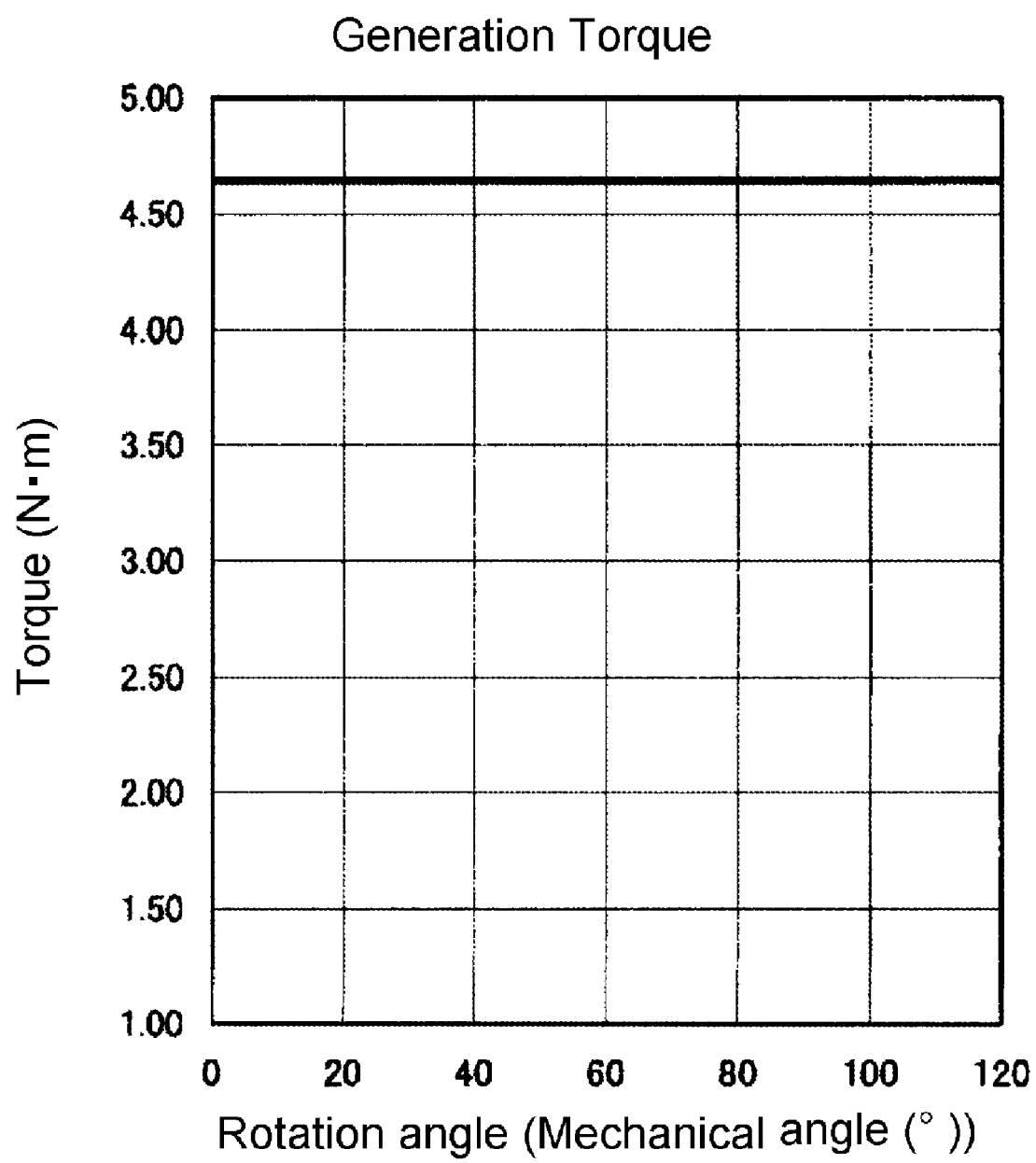
FIG. 7 is a diagram showing characteristics of generation torque of the brushless motor shown in FIG. 1.

FIG. 4 is an explanatory diagram of induction voltage on which harmonic of the brushless motor shown in FIG. 1 is superposed. FIGS. 5 to 7 are diagram showing characteristics of motor current, induction voltage and the entire generation torque of each phase of the brushless motor shown in FIG. 1.

The brushless motor shown in FIG. 1 is covered with a cylindrical housing 111 whose upper end is opened, and a cover portion 12 which covers the opening of the housing 11. The cover portion 12 is formed at its central portion with an opening. Ball bearings 131 and 132 are mounted on a portion of the cover portion 12 in the vicinity of the opening and a bottom surface of the housing 11. A shaft 21 projects upward from the opening of the cover portion 12. The shaft 21 is rotatably supported around coordinate axes of rotation of the motor.

A columnar rotor yoke 22 is mounted to the shaft 21. A plurality of field magnets 23a are disposed on an outer peripheral surface of the rotor yoke 22. The field magnets 23a are radially arranged such as to surround the shaft 21. A plurality of axial stripe magnetic poles are formed such that the south pole and the north pole appear alternately in the circumferential direction. The shaft 21, the rotor yoke 22 and the magnets 23a are main components of the rotor 2a.

The stator 3a surrounds an outer peripheral side of the rotor 2a. The stator 3a includes a yoke 30a comprising laminated magnetic plates. As shown in FIGS. 2 and 3, the yoke 30a is of a hollow cylindrical shape. The yoke 30a is formed at its inner peripheral surface with a plurality of slots 31a in the direction of coordinate axes of rotation of the motor. The slots 31a are arranged concentrically such that the inner peripheral surface of the yoke 30a is opposed to the outer peripheral surface of the rotor 2a. A portion of a stator yoke 30a between the slots 31a form teeth 32a, and the teeth 32a are arranged radially and project in an inner diameter direction of the stator yoke 30a. Coils 34 are wound around the teeth 32a with insulator 33 interposed therebetween, and a winding (armature winding) 35 of each phase is formed.

A wire 4 in FIG. 1 supplies motor current for driving motor to a coil 34 of each phase through a bus bar 5. A circuit substrate 6 detects a rotation angle position of the rotor 2a by a Hall element or the like.

The brushless motor of the embodiment is a practical three-phase brushless motor, sine wave motor current of U, V and W phases which are deviated through electrical angle of 120° is supplied to the three-phase winding 35 wound around the teeth 32a, the rotor 2a is rotated by rotation magnetic field of the stator 3a based on electric supply of motor current, and the brushless motor is driven.

Induction voltage adjusting means which is a feature of the present invention will be explained with reference to FIGS. 4 to 12.

Figure 8:
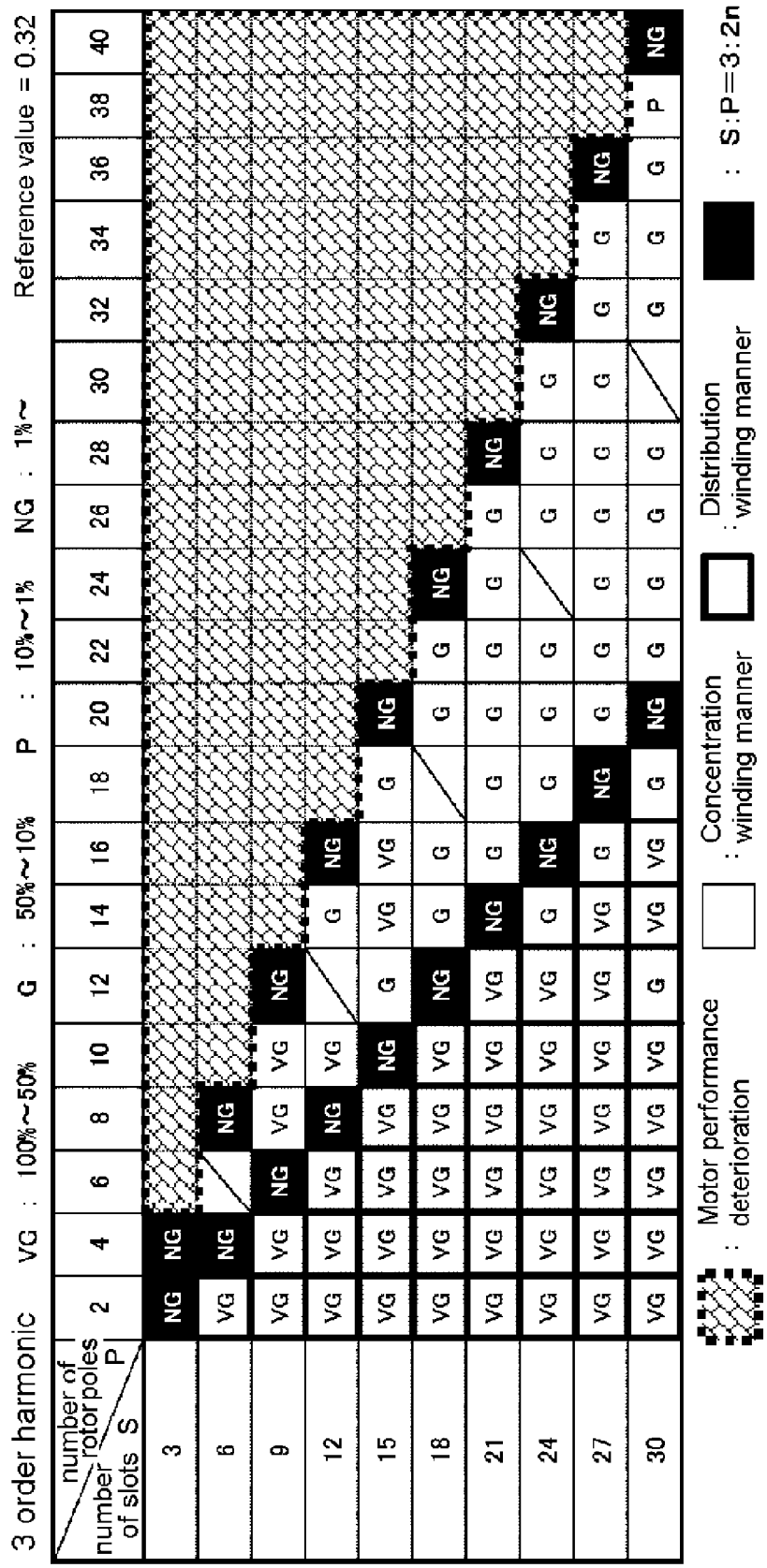
FIG. 8 is a diagram listing high order harmonic superposing ratio (3 order component) to one phase induction voltage in a combination of the number of various rotor magnetic poles and the number of stator slots.
Figure 9:
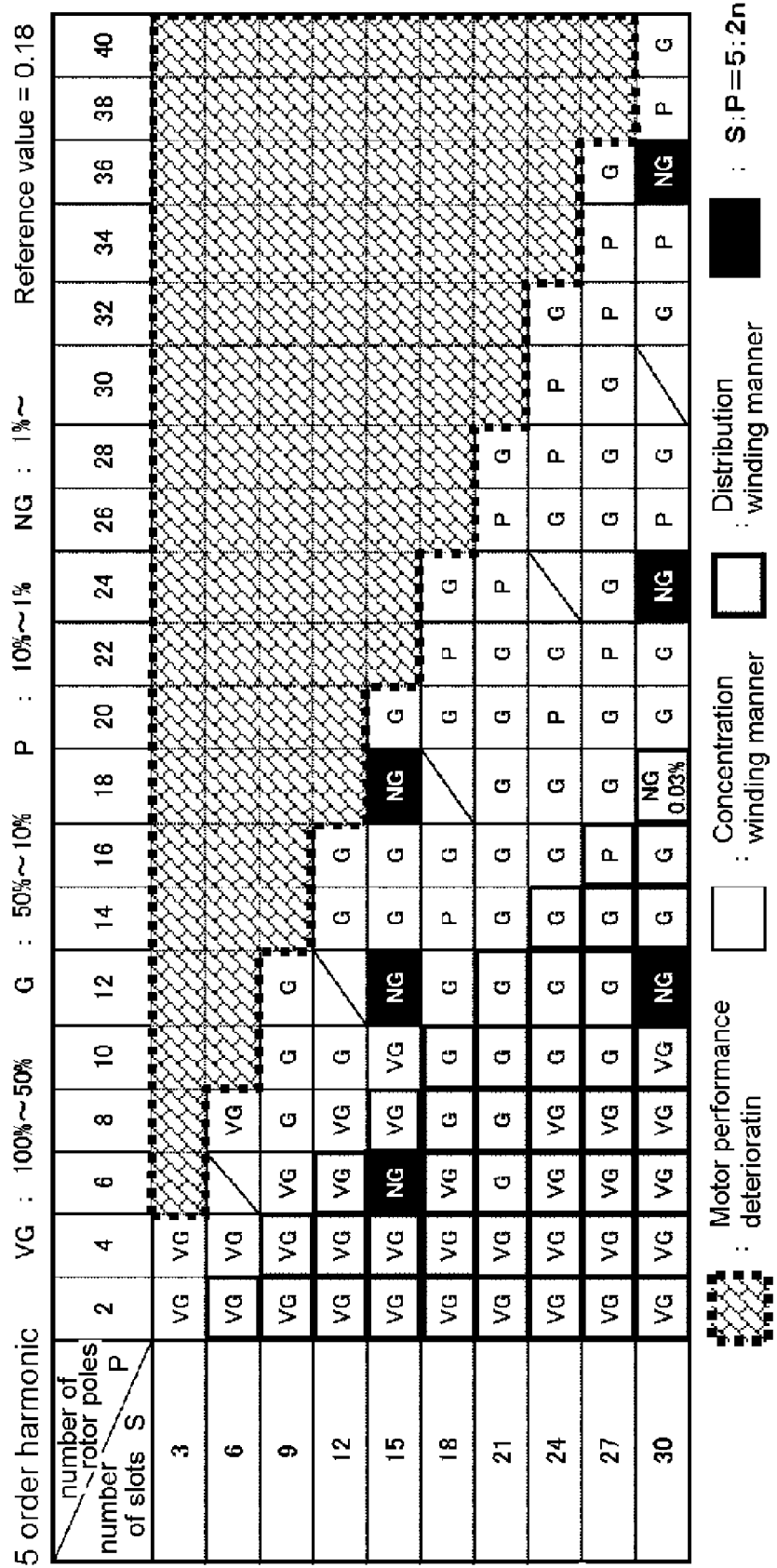
FIG. 9 is a diagram listing high order harmonic superposing ratio (5 order component) to one phase induction voltage in a combination of the number of various rotor magnetic poles and the number of stator slots.
Figure 10:
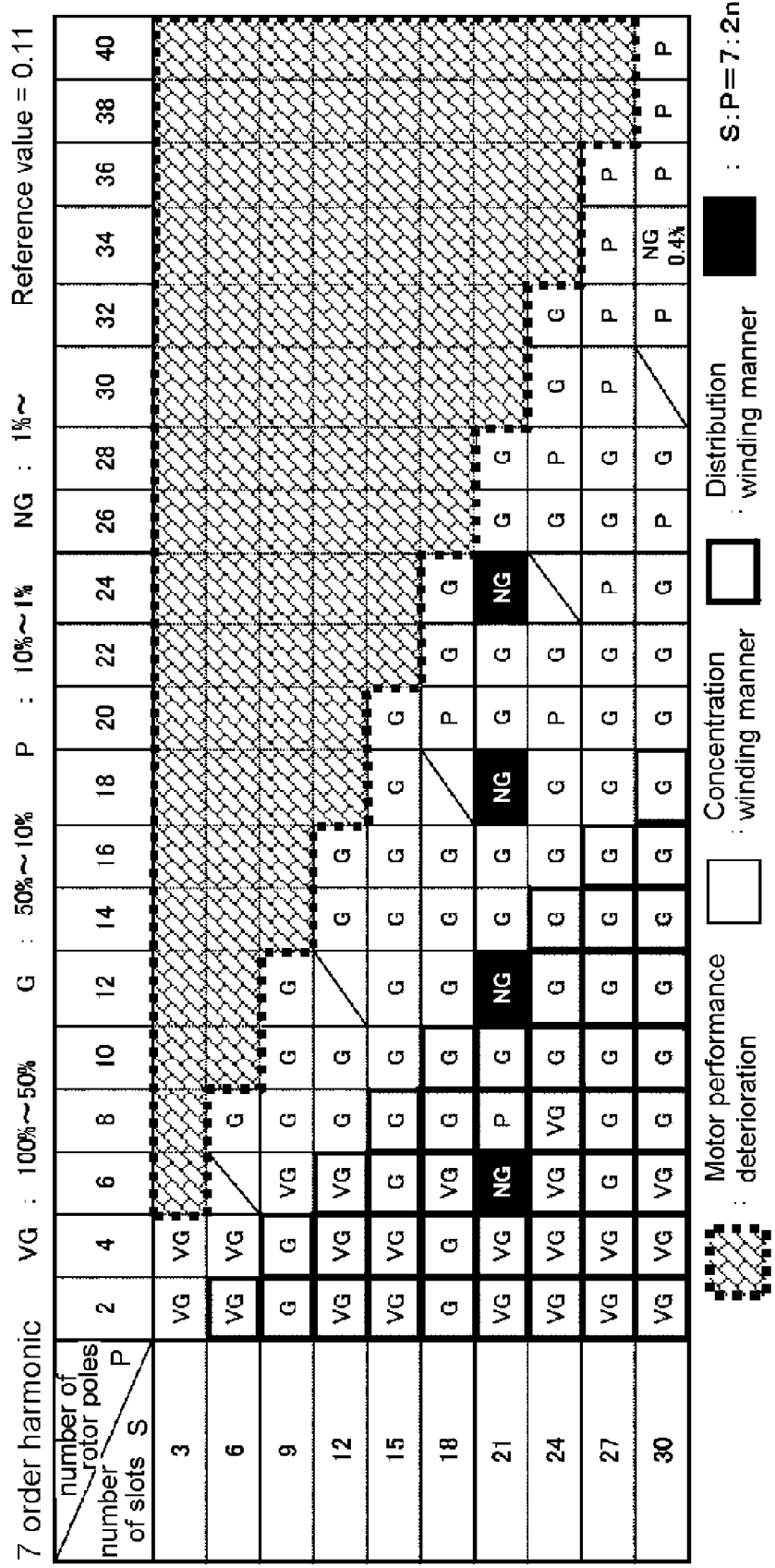
FIG. 10 is a diagram listing high order harmonic superposing ratio (7 order component) to one phase induction voltage in a combination of the number of various rotor magnetic poles and the number of stator slots.

FIG. 4 is an explanatory diagram of induction voltage of the brushless motor shown in FIG. 1 on which harmonic is superposed. FIGS. 5, 6 and 7 are diagrams showing characteristics concerning motor current, induction voltage and entire generation torque of each phase of the brushless motor shown in FIG. 1. FIGS. 8, 9 and 10 are diagrams listing analysis result concerning superposing ratio of harmonic component to induction voltage of one phase under condition of various combination of the number of rotor magnetic poles and the number of stator slots of the three-phase brushless motor. FIG. 8 shows the superposing ratio of harmonic component of 3 order harmonic component, FIG. 9 shows the superposing ratio of harmonic component of 5 order harmonic component, and FIG. 10 shows the superposing ratio of harmonic component of 7 order harmonic component.

Conventionally, the motor structure is set such that induction voltage (induction voltage of sine waveform shown with solid line Ea in FIG. 4) of the same phase as that of the motor current is generated in each phase of the stator 3a. Whereas, in this embodiment, induction voltage of odd-numbered order harmonic is superposed on the induction voltage of sine waveform shown with the solid line Ea.

In the embodiment, induction voltage adjusting means A is provided such that induction voltage of 3 order harmonic shown with solid line Eb in FIG. 4 is superposed, and induction voltage shown with solid line Ec having such a shape that an oblique line in FIG. 4 is more flat than the induction voltage of sine waveform shown with solid line Ea which is the basic wave.

The induction voltage adjusting means A is formed by magnetic poles of the rotor 2b and slots 31a of the stator 3a which are set to the predetermined number of combinations, and it was found that there exists an appropriate number of combinations from various experiments and analyses. FIG. 8 shows a result of analysis concerning the superposing ratio of the 3 order harmonic component to a one phase induction voltage in the combination of each combination of the number of rotor magnetic poles and the number of stator slots of the three-phase brushless motor, FIG. 9 shows a result of analysis of the superposing ratio of the 5 order harmonic component, and FIG. 10 shows a result of analysis of the superposing ratio of the 7 order harmonic component. Each drawing show the superposing ratio to the basic wave of N order harmonic under the combination conditions using the number (=S) of slots and the number (=P) of rotor magnetic poles as parameters.

In a practical range of combination of S and P, a degree of influence was checked while taking into consideration two kinds of winding manners of coil, i.e., a concentration winding manner in which winding was carried out every tooth and a distribution winding manner in which coils were wound around a plurality of teeth at the same time, and it was found that the superposing ratio has effective tendency depending upon the combination of S and P, and there is a special relation that N order harmonic is not superposed when S:P=N:2n (n is integer). That is, it becomes necessary to select N order harmonic suitable for superposing, and in order to superpose 3 order harmonic which is most effective superposing order in terms of efficiency and torque ripple in the three-phase brushless motor, a combination of S:P≠3:2n (n is integer) should be selected.

From FIGS. 8 to 10, a combination of 12S10P in which 12 (S=12) slots and 10 (P=10) magnetic poles was employed in the three-phase brushless motor so that 3 order harmonic is superposed as the induction voltage adjusting means A in a first embodiment. At that time, S:P=12:10=6:5≠3:2n.

When setting the number of combinations, magnitude of ratio of the basic wave and 3 order harmonic is also important, and the number of combinations of the stator yoke 30a and magnets 23a is set such that the basic wave and 3 order harmonic become predetermined ratio.

In this embodiment, as shown in FIG. 3, 12 slots 30a and 10 magnets 23a are evenly disposed, the brushless motor is formed into a structure of 12 slots and 10 poles (12S10P), and the brushless motor has the induction voltage adjusting means A. By supplying motor current of sine wave of U, V and W phases shown with solid lines Iu, Iv and Iw in FIG. 5, induction voltage of superposed waveform of U, V and W phases shown with solid lines Eu, Ev and Ew in FIG. 6 is generated stator 3a. At that time, a shape of a portion surrounded by characteristics curves of induction voltage of each phase with respect to rotation angle of the rotor 2a and the lateral axis (rotation angle) is more flat and spread by the superimposition of 3 order harmonic as compared with characteristics curve having only basic wave and thus, the motor generation torque is increased correspondingly.

In the embodiment, since the input of the brushless motor is not increased, the power consumption of the brushless motor is not increased.

In one cycle of basic wave, since the odd-numbered order harmonic has symmetric first half waveform and last half waveform of the basic wave, in the three-phase brushless motor, torque variation generated by the 3 order harmonic is cancelled within one cycle and no influence is generated, induction voltage of the superposed waveform does not indicate abrupt rising and lowering unlike the rectangular wave and thus, torque ripple is not generated.

Therefore, power consumption is not increased, the torque having extremely small torque ripple can efficiently be generated, and a small brushless motor having high output and new structure can be provided.

The three-phase brushless motor is indicated in this embodiment, but when a five, seven, . . . or K phase brushless motor is to be used, even if fifth, seventh, . . . or N order harmonic (e.g., N=K harmonic) is superposed, the torque ripple is not affected. Thus, when K phase brushless motor is used, N order harmonic is superposed, and order of harmonic to be superposed is selected in accordance with the phase number.

Although the 3 order harmonic is indicated as the odd-numbered order harmonic in this embodiment, higher order, such as 5 or 7 order harmonic may be superposed. However, as described above, if the 5 or 7 order harmonic is superposed in the three-phase brushless motor, torque ripple is affected and thus, it is necessary to adjust the torque ripple while using a method for reducing the affect (e.g., optimization of skew). In the brushless motor of the embodiment also, skew processing of pattern of each magnet 23a of the rotor 2a, and to suppress the generation of cogging torque.

The number of combinations of the magnetic poles of the rotor 2b and the slots 31a of the stator 3a is not limited to the 12 slots and 10 poles, and the same effect can be obtained also in a combination of S:P≠3:2n (n is an integer) and motor structures of 9 slots and 8 poles, 9 slots and 10 poles, and 12 slots and 14 poles.

Figure 11:
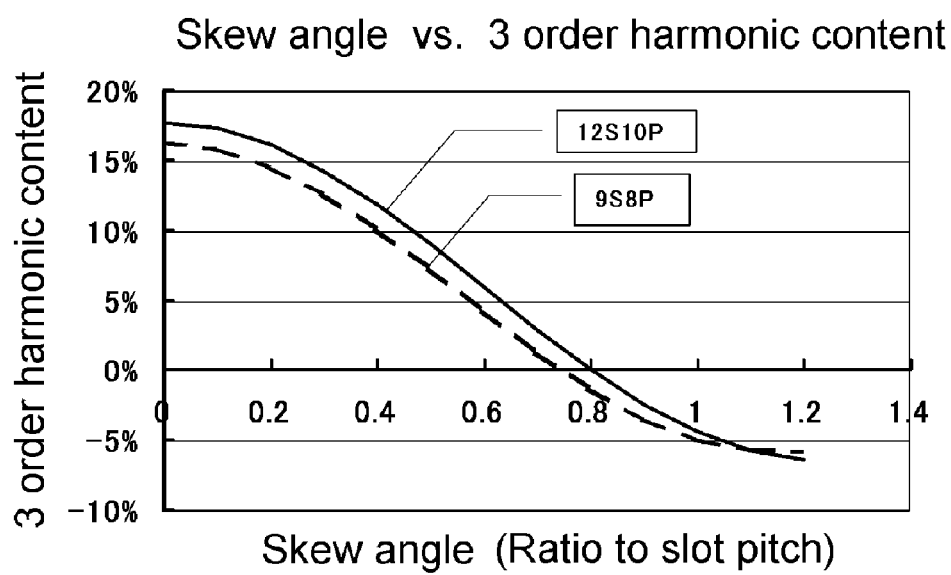
FIG. 11 is a diagram showing characteristics showing a relation between a skew angle of the brushless motor and 3 order harmonic superposing ratio.

Here, effect of the skew processing of the invention will be explained with reference to FIG. 11. FIG. 11 is a diagram of characteristics showing a relation between the skew angle (ratio of skew to the slot pitch) and 3 order harmonic superposing ratio.

It is known that by the skew processing in which an axial stripe-like magnetic pole pattern of the rotor is inclined in the axial direction, generation torque of each rotation phase is averaged, the entire rotation torque is smoothened, and induction voltage waveform of each phase can be formed into smooth sine waveform. It can be found from the drawing that as the skew angle is increased, the superposing ratio of the 3 order harmonic is reduced, and when the skew angle is about 0.8, the 3 order harmonic superposing ratio becomes 0, i.e., it is necessary to set the skew angle to a value between 0 to 0.8 to superpose the 3 order harmonic on the induction voltage of the phase and to increase the output. When the skew angle is about 0.6, the induction voltage of the phase becomes sine wave, about 5% of the superposing ratio of the 3 order harmonic at which the effective effect of the superposing ratio can be found is secured and thus, it is preferable that the skew angle is set to a value between 0 to 0.6.

In this embodiment, it is adjusted such that the 3 order harmonic which does not affect the torque ripple is mainly superposed, and the 5 or 7 order harmonic which affects the torque ripple is not superposed. Thus, the skew angle is set to 25% of the slot pitch, but the optimal value may be selected from the above angle range as the skew angle in accordance with the smoothness and balance of the required magnitude of the output torque.

Second Embodiment

Next, a second embodiment will be explained with reference to FIG. 12.

Figure 12:
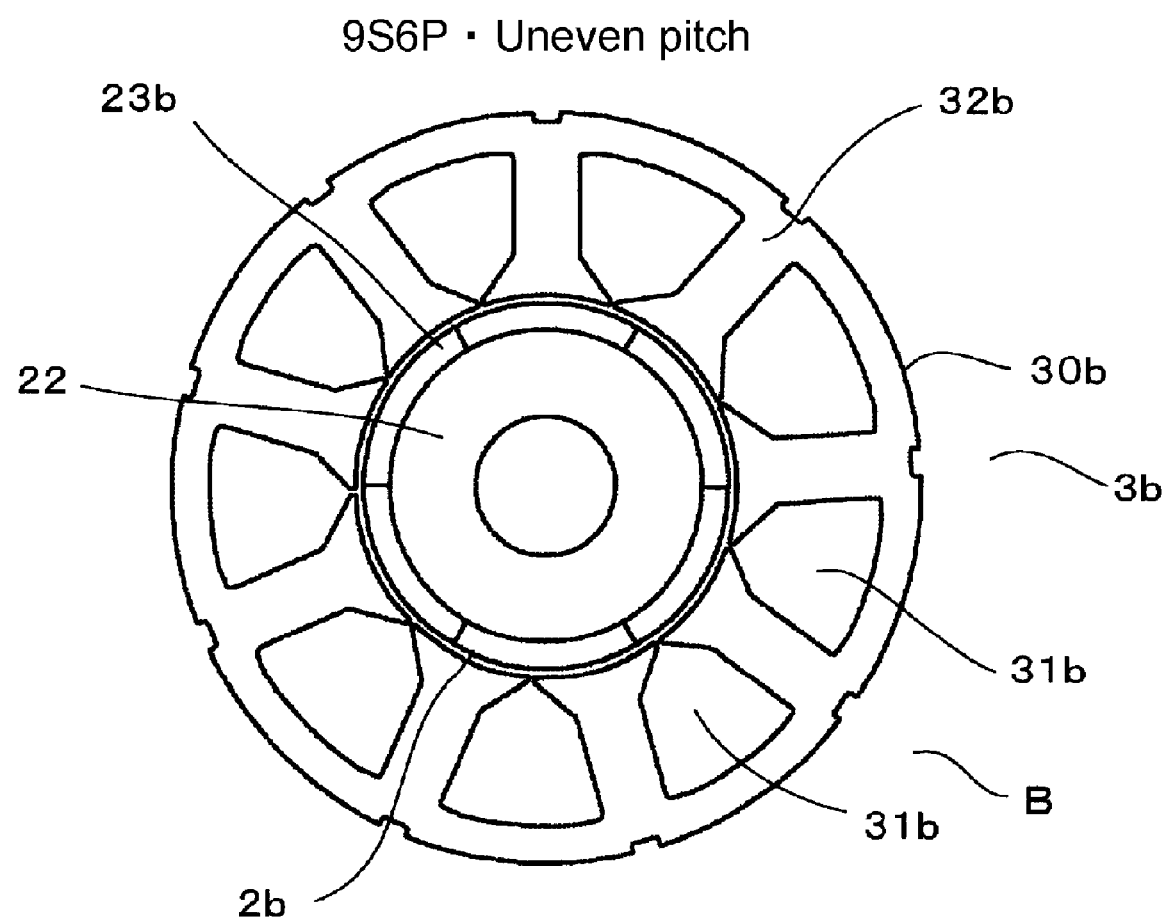
FIG. 12 is a plan view of a portion of a brushless motor of a second embodiment of the invention.

FIG. 12 is a plan view of a portion of the brushless motor. In the second embodiment, induction voltage adjusting means B is formed which generates the odd-numbered order harmonic by providing slots of uneven distances are provided in the stator.

More specifically, in the embodiment, the brushless motor is a three-phase brushless motor of 9 slots and 6 poles (9S6P) in which the rotor 2b includes six magnets 23b and the stator 3b includes 9 slots 31B and teeth 32b. As shown in FIGS. 8 to 10, it is difficult to superpose the 3 order harmonic in the case of the motor of 9 slots and 6 poles (9S6P), but since the 5 or 7 order harmonic is superposed, the induction voltage adjusting means B of the embodiment is set such that 9 slots 31b of the stator 3b generated 5 order harmonic.

In the brushless motor of the embodiment, since the high order harmonic affects the cogging torque, a pattern of each magnet 23b of the rotor 2b may be subjected to the skew processing to reduce the cogging torque.

The number and disposition of the magnetic poles of the rotor 2b and the slots 31b of the stator 3b are not limited to the uneven pitch of the 9 slots and 6 poles, and the present invention may be applied to combinations having a relation of S:P=3:2n (n is an integer) such as 6 slots and 4 poles, 12 slots and 8 poles, 9 slots and 12 poles, and 15 slots and 10 poles, and to combinations of the rotor and stator having a relation of S:P≠3:2n (n is an integer).

Other Embodiments

The present invention is not limited to the above embodiments, and can variously be modified without departing from its subject matter.

That is, the present invention is applied to a K-phase (K is an integer equal to or higher than 2) brushless motor, and the same effect as that of the previous embodiments can be obtained.

The K-phase motor current to be supplied to the stator of the brushless motor is not limited to the sine waveform, and various waveforms may be employed. For example, rectangular waveform, or a waveform in which harmonic is superposed on sine wave may be employed.

Further, the harmonic of each phase of the stator is not limited to K order harmonic, and various odd-numbered order harmonic which is set from generation condition of torque may be employed.

Next, the induction voltage adjusting means is not limited to the examples of the embodiments only if the induction voltage of each phase of the stator is adjusted to waveform on which the odd-numbered order harmonic is superposed and for example, the induction voltage adjusting means may be formed such that a predetermined odd-numbered order harmonic is generated by deforming the shape of the rotation coordinate axial direction of the rotor of each magnetic pole of the rotor from uniform stripe shape by adjustment of skew angle of ring magnet or adjustment of magnet shape of a segment magnet, or such that the size of the tip end of tooth of the stator or the inclination angle at which the teeth are opposed to the rotor may be formed such that the predetermined odd-numbered order harmonic is generated by disposing the teeth unevenly on the stator. A portion or all of setting of the combination numbers, disposition of slots at uneven distances from one another, deformation of shape of the magnetic pole of the rotor, and disposition of teeth at uneven distances from one another may be combined and formed.

Therefore, modifications existing within the sprit and the scope of the present invention are included in the scope of claims.

FIRST EXAMPLE

Figure 16:
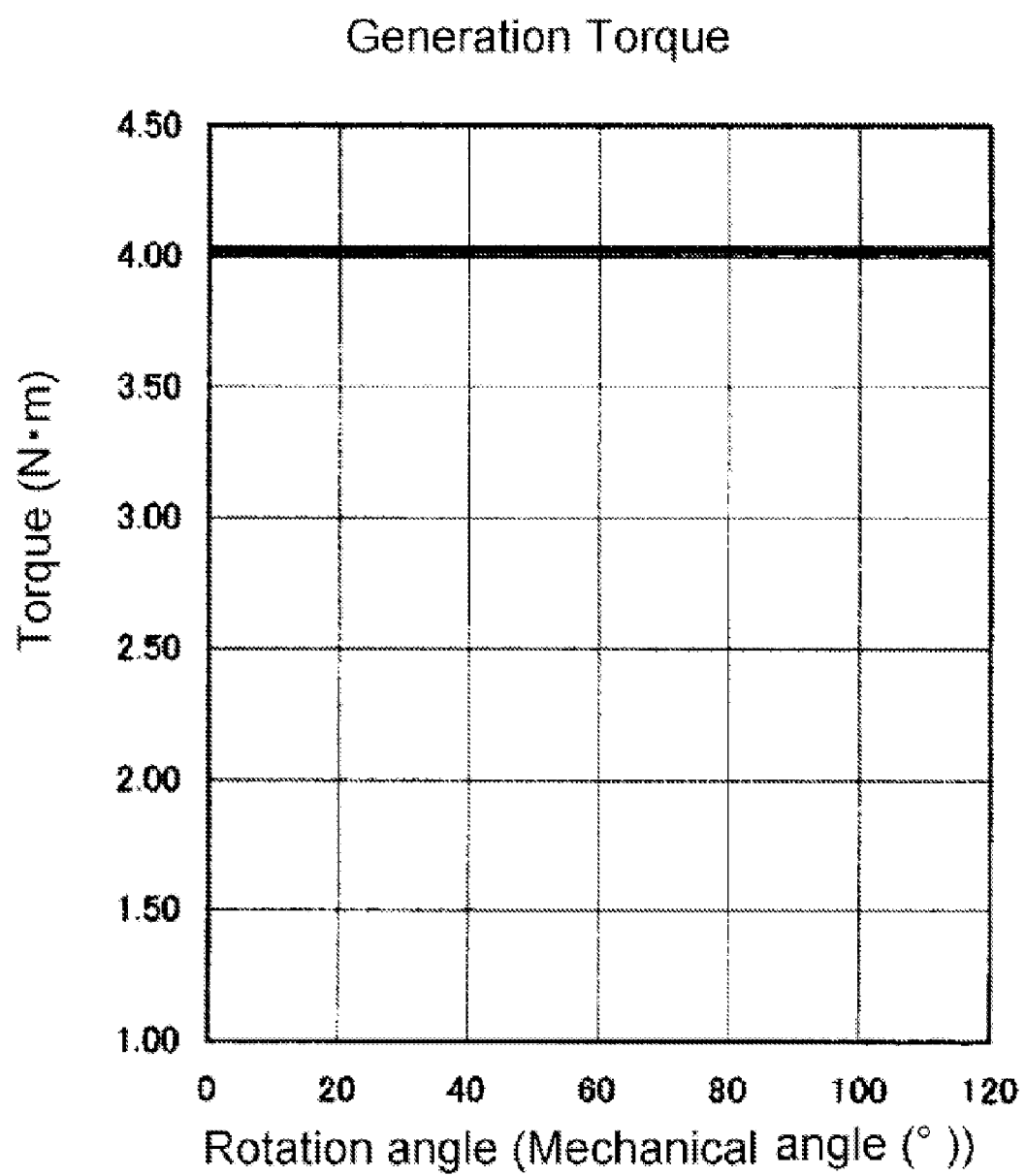
FIG. 16 is a diagram showing characteristics of generation torque of a conventional motor (12S10P)

FIG. 7 shows generation torque characteristics analysis values when the 3 order harmonic component is superposed on the phase induction voltage as shown in the first embodiment in the three-phase 12 slots and 10 poles (12S10P) brushless motor. FIG. 16 shows generation torque characteristics analysis values when the 3 order harmonic component is not superposed in the same brushless motor.

By superposing the 3 order harmonic component, the power source input condition is constant, and the motor output is increased by 15% from 4.0[N·m] to 4.6[N·m].

From this result, it was confirmed that output efficiency of the brushless motor could be enhanced under the same input condition.

SECOND EXAMPLE

Figure 13:
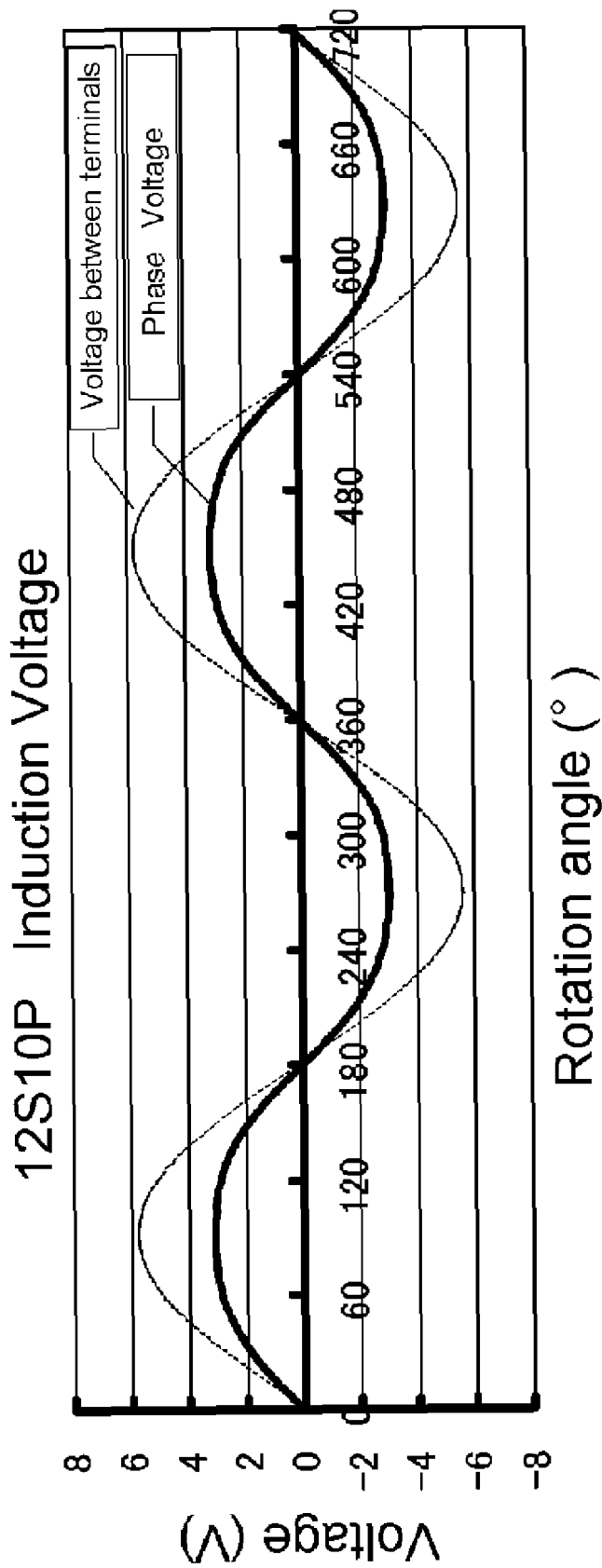
FIG. 13 is a diagram showing actually measured waveform of induction voltage of the brushless motor (12S10P) of the first embodiment of the invention.
Figure 14:
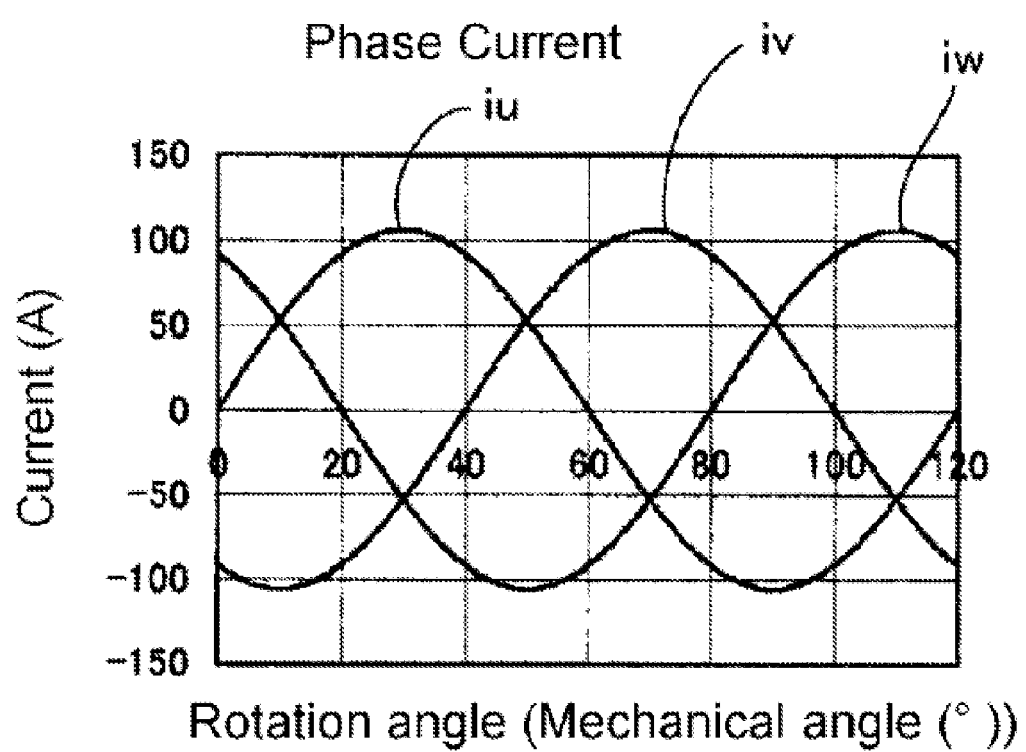
FIG. 14 is a diagram showing waveform of motor current of each phase of a conventional motor (12S10P)
Figure 15:
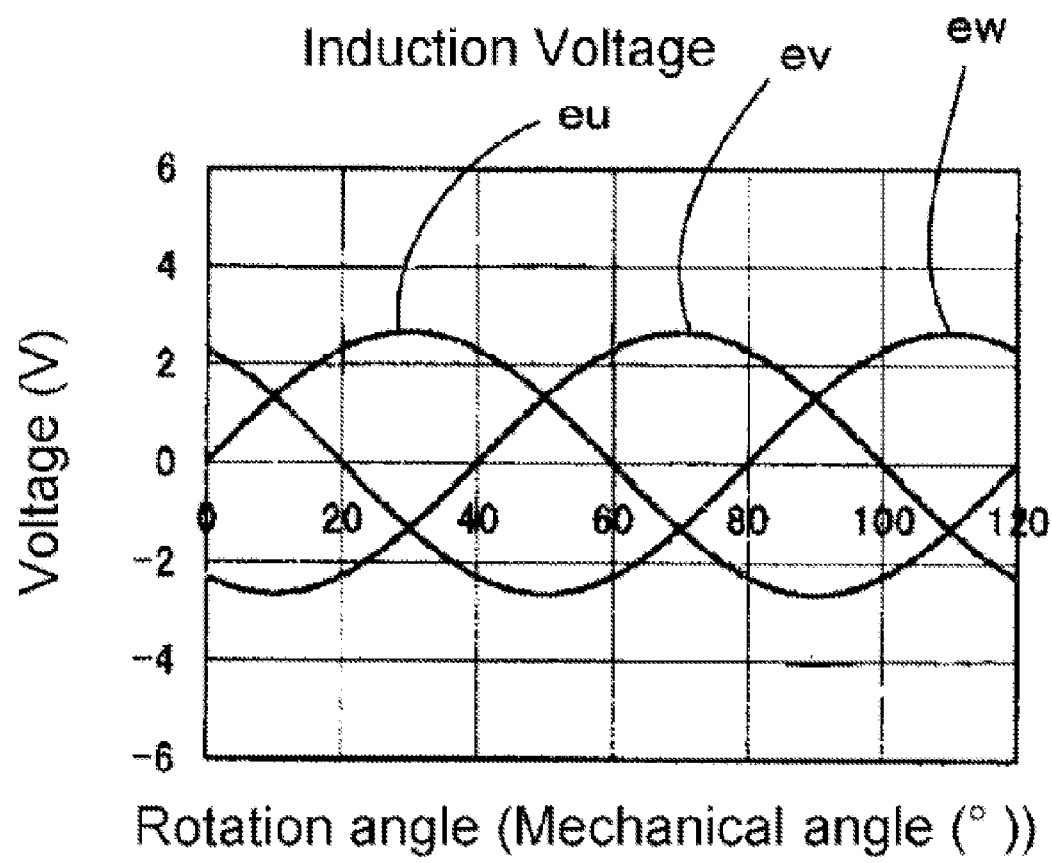
FIG. 15 is a diagram showing waveform of induction voltage of each phase of a conventional motor (12S10P)
Figure 17:
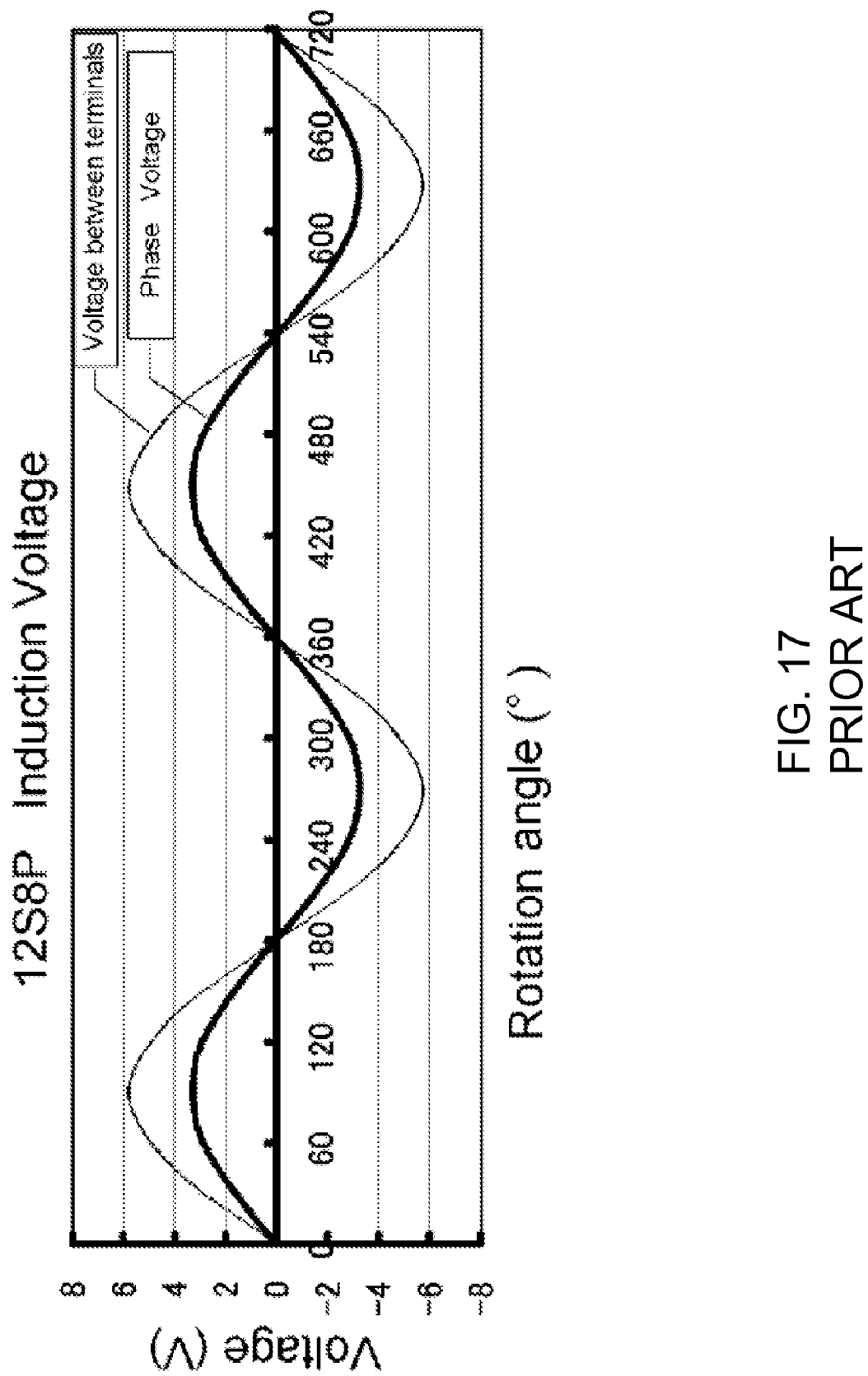
FIG. 17 is a diagram showing actually measured waveform of induction voltage of a conventional motor (12S8P)

FIG. 13 is a diagram showing actually measured waveform of induction voltage of the three-phase 12 slots and 10 poles brushless motor (12S10P) (skew ratio=25% of slot pitch) of the first embodiment of the invention. FIG. 17 is a diagram showing actually measured waveform of induction voltage of the three-phase 12 slots and 8 poles brushless motor (12S8P) (skew ratio=60% of slot pitch) of a conventional structure having the same size. FIG. 18 is a comparison table of characteristics actually measured data of brushless motors of the structure (12S10P) to which the present invention is applied and of the conventional structure (12S8P).

Basically, size and material of both the motors are the same, and in the basic structure, only the number of the slots, the number of magnetic poles and the skew ratio are different.

The 12S8P of the conventional structure has a relation of S:P=3:2n, and it could be demonstrated that it is difficult to superpose the 3 order harmonic as described above (the actually measured 3 order harmonic superposing ratio was 0.2%) by actually measured waveform of the induction voltage. On the other hand, the actually measured value of the 3 order harmonic superposing ratio of the structure 12S10P of the present invention was 6.8%.

The input power supply was adjusted so that both of them could obtain the same output values 340W, and the obtained characteristics values were compared with each other, and it was confirmed that the input value and resistance value between terminals of the structure (12S10P) to which the present invention was applied are smaller than those of the motor of the conventional structure (12S8P) by about 17%.

With this result, it could be demonstrated that if the present invention was applied, the same output could be obtained with the same size and with lower input. Thus, it can be said that a small brushless motor having high output can be produced.

THIRD EXAMPLE

In the three-phase brushless motor of 12 slots 8 poles (12S8P), if the skew angle is set to 48% of the slot pitch, the harmonic including component is only the 5 order harmonic, and it was actually measured that 5 order harmonic superposing ratio of 1.8% could be obtained.

What is claimed is:

1. A brushless motor comprising:
a stator having teeth which has S slots;
a rotor having a rotor magnet which has P poles; and
an induction voltage adjusting portion arranged to adjust an induction voltage of each phase of the stator to a waveform on which an N-order harmonic is superposed; wherein
S:P≠N:2n (n is a positive integer), S/P≠1 and S/P>3/4, and a number of phases of the brushless motor is K which is an integer satisfying K≧2, whereby the N-order harmonic is superposed on the induction voltage of each phase of the stator, where N indicates order of harmonic and has an odd number satisfying N≧3, and
a basic waveform of motor current of each phase of the stator is a sine waveform.

2. The brushless motor according to claim 1, wherein N=K.

3. The brushless motor according to claim 2, wherein the brushless motor is used for power steering.

4. A three-phase brushless motor comprising:
a stator having teeth which has S slots;
a rotor having a rotor magnet which has P poles;
an induction voltage adjusting portion arranged to adjust an induction voltage of each phase of the stator to a waveform on which a 3-order harmonic is superposed; wherein
S:P≠3:2n (n is a positive integer), S/P≠1 and S/P>3/4, whereby the 3-order harmonic is superposed on the induction voltage of each phase of the stator, and
a basic waveform of motor current of each phase of the stator is a sine waveform.

5. The three-phase brushless motor according to claim 4, wherein a ratio α of skew of a magnetic pole on the side of the stator or the rotor to a slot pitch of the stator is in a range of 0<α≦0.8.

6. The three-phase brushless motor according to claim 5, wherein the induction voltage adjusting portion includes the poles P being arranged unevenly in a stripe shape pattern in a direction of coordinate axes of rotation in which a plurality of magnets are radially disposed on an outer peripheral surface or inside of the rotor.

7. The three-phase brushless motor according to claim 6, wherein combinations of numbers of the stator slots and the magnetic poles are 12 slots and 10 poles, 9 slots and 8 poles, 9 slots and 10 poles, or 12 slots and 14 poles.

8. A three-phase brushless motor comprising:
a stator having teeth which has S slots;
a rotor having a rotor magnet which has P poles;
an induction voltage adjusting portion arranged to adjust an induction voltage of each phase of the stator to a waveform on which a 5 or 7 order harmonic is superposed; wherein
S:P≠3:2n (n is a positive integer) and S/P>3/4, whereby the 5 or 7 order harmonic is superposed on an induction voltage of each phase of the stator, and
a basic waveform of motor current of each phase of the stator is a sine waveform.

9. The three-phase brushless motor according to claim 8, wherein a ratio α of skew of a magnetic pole on the side of the stator or the rotor to a slot pitch of the stator is in a range of 0<α≦0.8.

10. The three-phase brushless motor according to claim 9, wherein the induction voltage adjusting portion includes an uneven arrangement of slots or teeth of the stator.

11. The three-phase brushless motor according to claim 10, wherein the induction voltage adjusting portion includes the poles P being arranged unevenly in a stripe shape pattern in a direction of coordinate axes of rotation in which a plurality of magnets are radially disposed on an outer peripheral surface or inside of the rotor.

12. The three-phase brushless motor according to claim 11, wherein combinations of numbers of the stator slots and the magnetic poles are 6 slots and 6 poles, 9 slots and 6 poles, 9 slots and 12 poles, or 12 slots and 8 poles, or 15 slits and 10 poles.

13. The three-phase brushless motor according to claim 4, wherein a ratio α of skew of a magnetic pole on the side of the stator or the rotor to a slot pitch of the stator is in a range of 0<α≦0.6.

14. The three-phase brushless motor according to claim 8, wherein a ratio α of skew of a magnetic pole on the side of the stator or the rotor with respect to a slot pitch of the stator is in a range of 0<α≦0.6.

* * * * *